C. T. SILVER.
AUTOMOBILE HOOD.
APPLICATION FILED FEB. 18, 1918. RENEWED APR. 14, 1919.
1,314,436.
Patented Aug. 26, 1919.
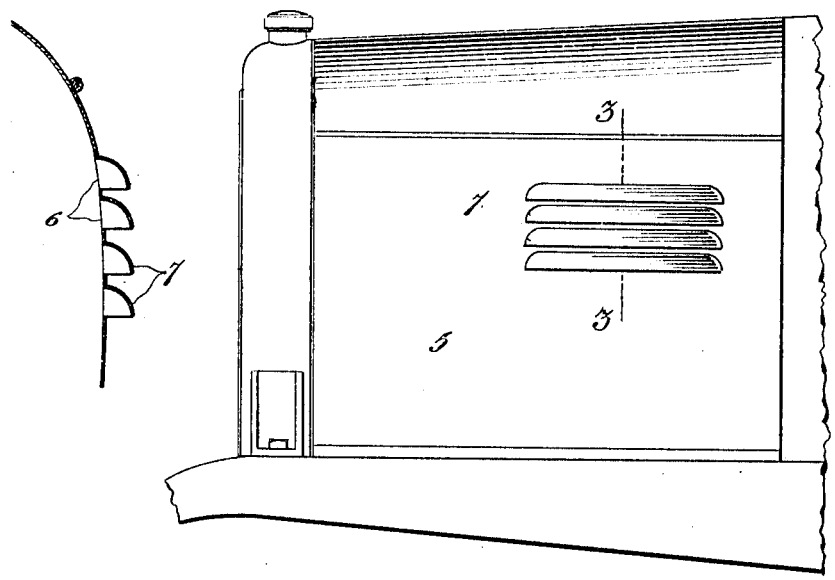
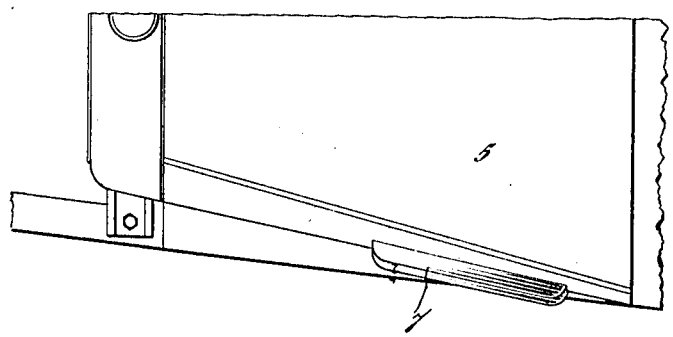
WITNESSES
INVENTOR
Conover T. Silver:
BY
ATTORNEYS

UNITED STATES PATENT OFFICE.

CONOVER T. SILVER, OF NEW YORK, N. Y.

AUTOMOBILE-HOOD.

1,314,436.      Specification of Letters Patent.      Patented Aug. 26, 1919.

Application filed February 18, 1918, Serial No. 217,901. Renewed April 14, 1919. Serial No. 290,091.

*To all whom it may concern:*

Be it known that I, CONOVER T. SILVER, a citizen of the United States, and a resident of New York city, borough of Manhattan, in the county of New York and State of New York, have invented a new and Improved Automobile-Hood, of which the following is a full, clear, and exact description.

My invention has for its object to provide an automobile hood having horizontally disposed louvers which prevent the spark plug from short circuiting by rain and which permit the rapid escape of the heated air adjacent the top of the hood while preventing the escape of cooler air at a lower level.

Additional objects of the invention will appear in the following specification in which the preferred form of my invention is described.

In the drawings, similar reference characters refer to similar parts in all the views, in which Figure 1 is a side elevation of an automobile hood provided with my improvement.

Fig. 2 is a fragmentary plan view of Fig. 1.

Fig. 3 is an enlarged sectional view on the line 3—3 of Fig. 1.

By referring to the drawings, it will be seen that the automobile hood 5 has at each side a plurality of horizontal openings 6, these openings 6 being disposed adjacent the top of the hood so that while the cool air entering the front of the hood may be prevented from passing out at the bottom of the sides of the hood, the heated air at the top of the hood may pass freely through the openings 6.

The openings 6 are covered by louvers 7 which are connected with the sides of the hood beyond the ends of the openings 6 and above the said openings, the louvers 7 being curved outwardly and downwardly as best illustrated in Fig. 3 of the drawings.

It will be seen by examining the drawings, that the louvers 7 are so disposed with reference to the openings 6 that they prevent rain from entering through the openings in the hood which would cause a short circuit at the spark plugs.

Having thus described my invention, I claim as new and desire to secure by Letters Patent:

1. An automobile hood having a top and a side with a horizontal opening adjacent the upper portion of the said side and a horizontal louver extending over the opening.

2. An automobile hood having a front, a top and two sides with openings at the front of the hood, there being a plurality of horizontally extending openings in each of said sides adjacent their upper portions, and a plurality of horizontal louvers extending outwardly over the ends of the openings and outwardly and downwardly over the top of the openings.

CONOVER T. SILVER.

Copies of this patent may be obtained for five cents each, by addressing the "Commissioner of Patents, Washington, D. C."